April 30, 1940.　　　F. B. WENDEL ET AL　　　2,198,643

METHOD OF AND APPARATUS FOR MAKING HOLLOW ARTICLES

Original Filed Sept. 28, 1935　　3 Sheets—Sheet 1

INVENTORS
Frans B. Wendel
Thomas H. Pearsall
BY Jarvis C. Marble
　their ATTORNEY.

April 30, 1940.　　F. B. WENDEL ET AL　　2,198,643
METHOD OF AND APPARATUS FOR MAKING HOLLOW ARTICLES
Original Filed Sept. 28, 1935　　3 Sheets-Sheet 2
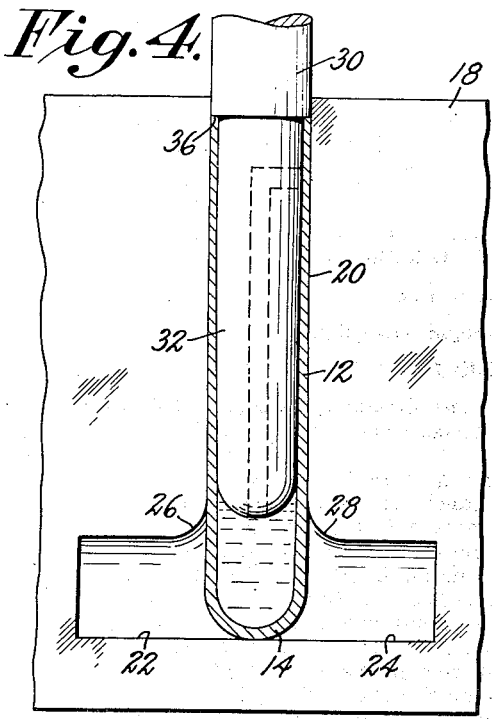
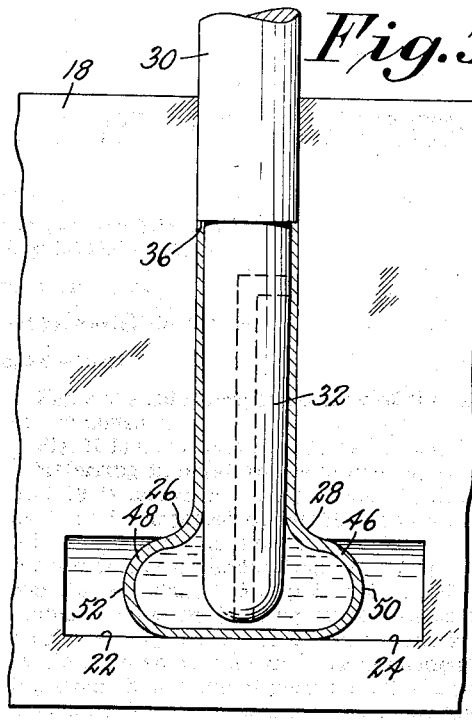
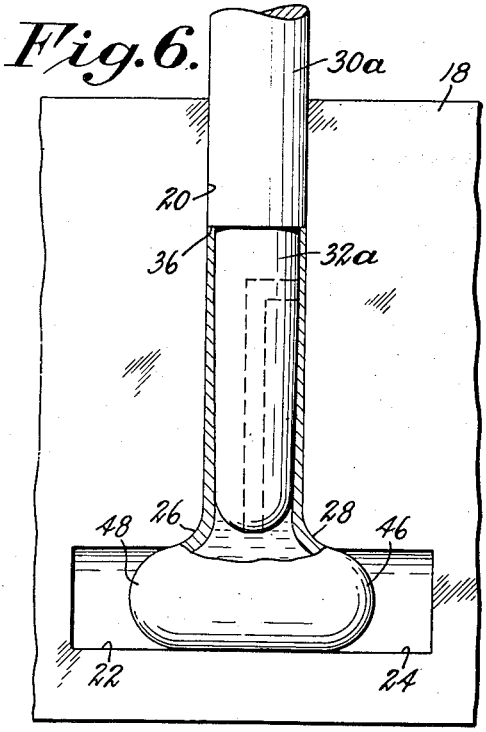
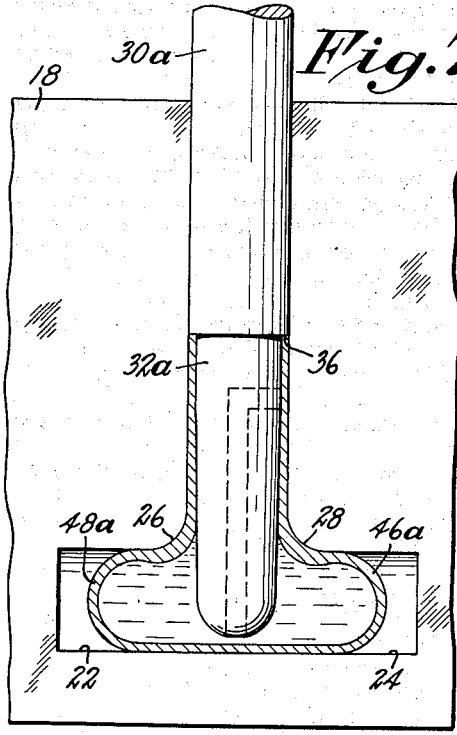
INVENTORS
Frans B. Wendel
Thomas H. Pearsall
BY Jarvis C. Marble
their ATTORNEY.

April 30, 1940.  F. B. WENDEL ET AL  2,198,643

METHOD OF AND APPARATUS FOR MAKING HOLLOW ARTICLES

Original Filed Sept. 28, 1935  3 Sheets-Sheet 3

INVENTORS
Frans B. Wendel
Thomas H. Pearsall
Jarvis C. Marble
BY their ATTORNEY.

Patented Apr. 30, 1940

2,198,643

UNITED STATES PATENT OFFICE 2,198,643

METHOD OF AND APPARATUS FOR MAKING HOLLOW ARTICLES

Frans B. Wendel, Long Island City, N. Y., and Thomas H. Pearsall, Waterbury, Conn., assignors, by mesne assignments, to W. S. A., Incorporated, New York, N. Y., a corporation of New York Application September 28, 1935, Serial No. 42,624
Renewed July 25, 1939

12 Claims. (Cl. 113—44)

The present invention relates to improvements in method of and apparatus for making hollow articles and has particular reference to the production of seamless hollow wrought metal fittings of ductile metal such as copper, aluminum, mild steel and the like. More specifically the invention relates to pipe fittings of the above character and their production by cold working from sheet metal stock.

A major aim of the invention is the production of improved fittings of the character set forth, in which the thickness of the walls is of commercial uniformity and in which certain parts of the fittings, as will hereinafter be more fully pointed out, are thickened as to wall section where additional strength is desirable. Further aims of the invention include the provision of means and method whereby the rapid and cheap commercial production of such fittings is obtained and certainty of manufacture with negligible loss through imperfect fittings is insured.

Other and more detailed aims of the invention, together with the advantages to be derived from its use, will appear more fully in the following portion of this specification, when taken in conjunction with the accompanying drawings in which:

Figs. 4 through 9 are cross-sectional views, similar to Fig. 3, showing different stages of operations;

The invention is particularly concerned with hollow fittings having a plurality of hollow connected and intersecting branches such as pipe T's, crosses, elbows, Y fittings and the like and in general may be considered as an improvement upon the invention of Frans B. Wendel which contemplates the formation of such hollow fittings from sheet or plate stock by first forming an open ended cylindrical shell therefrom and thereafter deforming the shell to desired contour in suitable external dies by the application of mechanical end pressure to the open end of the shell while internally supporting and guiding the flowing metal by the pressure of an internal filler of distortable nature, preferably a liquid, the pressure of which is determined by movement of the element applying the mechanical end pressure.

In order best to illustrate the present invention, we have chosen by way of example and will now describe the method and means whereby a T fitting is produced, but it will be understood that the invention is not limited to the formation of this particular shape of fitting.

Figure 1:
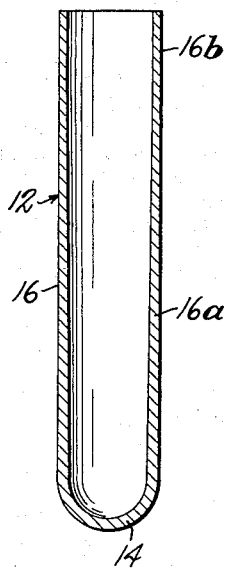
Fig. 1 is a plan view of a flat sheet metal blank.
Figure 2:
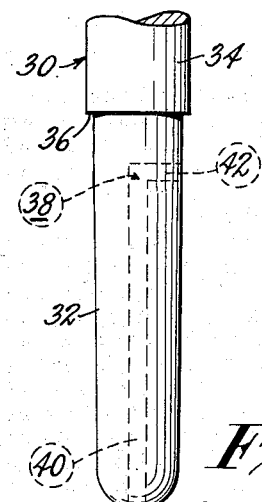
Fig. 2 is a cross-sectional view of the blank drawn to the form of a hollow open ended shell.

Referring now more particularly to the drawings, Fig. 1 illustrates a circular blank 10 of sheet material, which through a series of blanking and cupping operations of known kind is drawn to the form of a shell 12 of cylindrical form, open at one end and preferably closed at its other end by a hemispherical bottom 14, as shown in Fig. 2. Further, the shell thus formed is made with the walls of the cylindrical portion 16 tapered as indicated in somewhat exaggerated manner for the sake of clarity in Fig. 2. In addition, it is advantageous that the bottom portion 14 be of uniform thickness, and that the lower end of the cylindrical wall portion be of similar uniform thickness. It is also desirable that for some distance adjacent to the open end of the shell, the cylindrical side wall be of uniform thickness which is, however, less than the thickness of the bottom portion 14 by an appreciable amount. For convenience, the tapered part of the cylindrical wall portion has been designated at 16a and the part of uniform thickness at 16b. As indicated in the drawings it is preferable that the taper be of uniform character, the thickness of the metal increasing gradually in the direction away from the part 16b.

For the sake of brevity the finished form of shell blank has been shown without intermediate steps being indicated. It will be evident to those skilled in the art that such a shell will normally be produced by a series of redrawing operations coupled with annealing of the metal between redraws. The number and detailed character of such operations will vary with the metal worked, but the considerations entering into the production of such shells are well known and need not be touched upon further in this description.

Figure 3:
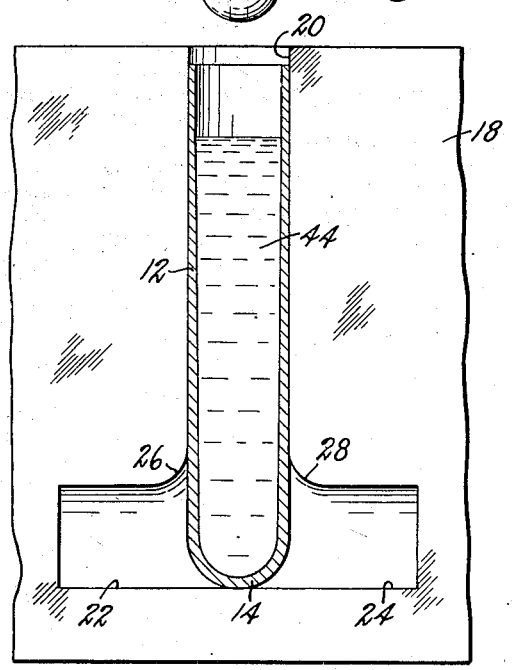
Fig. 3 is a cross-sectional view of the shell in die and punch apparatus preparatory to working operations.

For forming the desired T fitting from such a shell, it is placed in external sectional dies, one of which is shown at 18 in Fig. 3. The dies shown each have semi-cylindrical recesses which mate to form the bore or feed channel 20 and the bore portions 22 and 24 which may be considered as one or several feed channels. The two bore portions 22 and 24 are in alignment and transverse to the bore 20. Bore 20 corresponds to the outlet portion or neck of the T to be formed and the portions 22 and 24 correspond to the run portion of the T. As illustrated, the dies are parted on the plane of the axes of the bores, but it will be evident that they may be parted on other planes.

At the place of juncture between the outlet and run portions of the die recesses the dies are curved on radii of substantial length, as indicated at 26 and 28. The diameter of bore 20 substantially coincides with the external diameter of the shell, so that the latter is firmly supported externally in the die.

It will be understood that the die blocks 18 are firmly locked together in suitable die holding apparatus and advantageously may be held in a punch press of any suitable known form of construction and having a reciprocable head for holding a punch. Such apparatus need not be described herein.

For cooperation with die 18, a punch 30 is provided having a pilot portion 32 and a body portion 34 between which portions there is a shoulder 36. The lower part of the pilot portion is advantageously tapered about as the shell is tapered and further is preferably hemispherical at its lower end. Also, the portion of the pilot adjacent to the shoulder is advantageously of straight cylindrical form and of a diameter such that it provides a snug or plug fit in the top of the shell. The diameter of the body portion preferably is such that there is only a very small clearance between it and the walls of bore 20 of the die when the punch enters.

In the embodiment illustrated a relief channel 38 is provided in the form of a central bore 40 extending upwardly from the lower end of the pilot to a point short of the shoulder 36 where it communicates with a transverse bore 42 terminating at the surface of the pilot below the shoulder. This relief channel may take other forms and more than one channel may be provided. Also, the diameter of the pilot portion may be made somewhat smaller than the internal diameter of the shell, so that a small clearance space acts as a relief channel. The form shown has, however, proved to be most satisfactory in actual practice.

Either before or after being placed in the dies, liquid 44 is placed in the shell, the latter preferably being well filled to insure a sufficient quantity.

The punch 30 is then moved downward by suitable actuation of the press and during the portion of its movement from the position shown in Fig. 3 to that shown in Fig. 4, excess liquid is expelled from the shell through the relief channel 38. After the outlet of bore 42 passes the top edge of shell 12, the internal pressure of the liquid is increased so that a substantial preliminary internal pressure is built up by the time the shoulder 36 seats against the upper edge of the shell. In other words, the shell acts as a cut-off valve to close the relief channel outlet. The section of the pilot portion above channel 42 may be considered as a bottling portion since it acts as a stopper to bottle the liquid in the shell.

Continued movement of the plunger from the position of Fig. 4 to the position of Fig. 5 forces the upper portion of the shell downwardly in bore 20, and this mechanically produced movement of the shell, coupled with the internal pressure, forces and guides the material of the shell outwardly in opposite directions in contact with the walls of the bores 22 and 24.

The flow of metal from bore 20 into bores 22 and 24 is accompanied by a thickening of the metal where it changes direction of flow around the curved surfaces 26 and 28 provided at the place of juncture of the bores. This is due to the fact that the greatest resistance to flow of metal occurs at these places. This tendency of the metal to thicken at these places tends to further increase the value of the internal pressure within the shell, and the pressure so produced is sufficient to prevent wrinkling or buckling inward of the metal away from the die surfaces. The semi-formed branches 46 and 48 of the shell are formed with roughly hemispherical ends 50 and 52 by the internal fluid pressure and it is to be noted that external die support for these ends is not required to prevent their bursting because of the fact that metal is positively fed to these branches by the mechanical end pressure exerted by the punch against the rim of the shell, which we regard as the primary forming force.

As previously noted, the greatest resistance to the flow of the metal is at the surfaces 26 and 28. The internal pressure exerted by the fluid acts equally in all directions and it will be evident from a consideration of Fig. 5 that the tendency of different portions of the walls of the branches 46 and 48 to pull under the influence of internal pressure will not be equal. The tendency of the metal to pull and become thinner in section will be greater along the bottom of the transverse bores than along their tops. It is for this reason that we taper the walls of the shell and provide a relatively thick and heavy bottom portion. This formation of the shell substantially compensates for the inequality of metal flow occasioned by uniform internal pressure and unequal resistance to movement of the metal along the surface of the dies.

After the shell is formed to the shape shown in Fig. 5, it is removed and annealed, and then replaced in the same or similar dies as shown in Fig. 6. It again is provided with liquid filler, and the branches 46 and 48 further formed to the shape indicated at 46a and 48a by the action of a punch 30a moving from the position shown in Fig. 6 to the position shown in Fig. 7. Punch 30a is similar to punch 30 except that the pilot portion 32a is shorter than the pilot portion 32 of punch 30. It will be observed from Figs. 5 and 7 that when the punches are at the bottoms of their respective strokes the lower ends of the pilots are well into the run portion of the T and advantageously they are as shown, adjacent to the bottom wall of the shell. The long pilots we regard as of importance, since they appear to definitely aid in preventing inward thickening of the metal at the centers of the two opposite side walls of the run portion of the T below the outlet portion.

Figure 8:
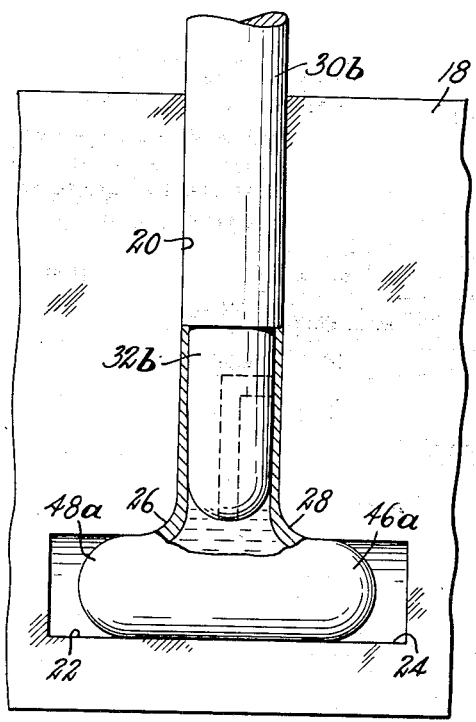

After the operation shown in Figs. 6 and 7 is completed the shell is again removed and annealed, provided with liquid filler and replaced in dies as shown in Fig. 8. In the next step it is acted on by a punch 30b and under the influence of end pressure and internal pressure the ends of the branches 46b and 48b are squared, as at 50b and 52b, against the ends of the die bores 22 and 24. In this case the pilot portion 32b is still shorter than the pilot portions of the previously used punches, but as seen in Fig. 9 is advantageously long enough to penetrate well into the run portion of the blank.

Figure 9:
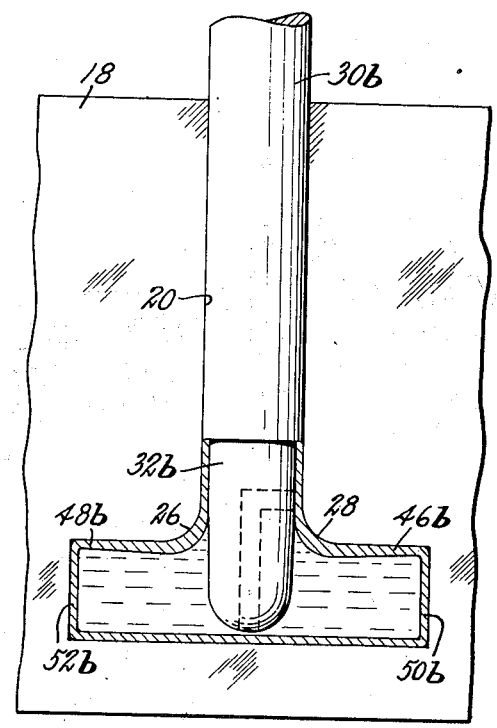
Figure 10:
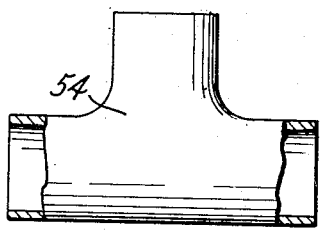
Fig. 10 is a cross-sectional view of a T fitting produced in accordance with our invention.

After having been formed to the shape shown in Fig. 9, the ends of the run are apertured, advantageously by sawing or otherwise removing the ends 50b and 52b to form the T shaped article 54 shown in Fig. 10. Obviously the forming of the blank need not be continued until the ends are squared before the ends are removed, but by squaring the ends, rapid production with minimum wastage of material is accomplished.

Figure 11:
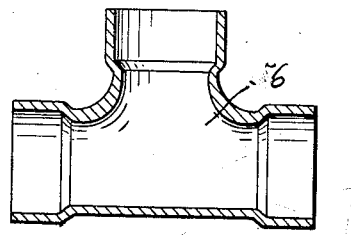
Fig. 11 is a cross-sectional view of a T fitting with expanded ends.

We have found that the invention is particularly effective in the production of thin walled fittings of copper or like material, of the kind commonly known as "sweat-joint" fittings. The ends of such fittings are ordinarily belled to receive the ends of tubing and such type of fitting is readily produced by expanding the ends of the fitting shown in Fig. 10, by means of suitable plug expanding dies of well known kind, to form a fitting 56 as shown in Fig. 11.

While the process of forming the T blank from the shell blank has been shown as accomplished in three operations, it will be understood that the number of operations required will vary with different materials and different wall thicknesses and will also depend upon the length of the run which it is desired to produce.

We have found that for forming T's of material which is substantially all copper and which are of the sizes commonly employed for sweat fittings in plumbing and allied piping work, the walls of the shell blank are advantageously tapered so that the thickness of the bottom of the shell is from 30% to 50% greater than the thickness at the open end. The larger the size of the fitting to be formed, the greater the variation in thickness for best results. With a proper taper to the shell, we have found that the wall thickness of the fitting (except for the thickened rounded parts at the juncture of the outlet and the run) can readily be kept to commercial uniformity.

We have further found that the amount of thickening produced at the juncture is readily controlled by varying the radius of curvature, increase in thickness of metal at this point accompanying decrease of radius of curvature. For the manufacture of pipe T's, we find best results to be obtained if the radius is not less than one-quarter inch in the case of a small T such as a three-eighths inch size and not less than one-half inch in the case of a T of two inch size. Preferably the radius is somewhat larger than stated above, in proportion to the T size, to reduce as far as possible the resistance to flow of metal around the curved surfaces 26 and 28 during forming and to give a finished product such that there may be free flow of fluid therethrough.

In carrying out the process we have found that the sealing of the proper quantity of fluid in the shell is important and have further found the most convenient way to determine the proper quantity of fluid in any given case is to vary the distance of the outlet of the relief channel from the shoulder of the punch. In this connection we may state that it is our belief that a positive seal is not provided until the shoulder of the punch seats, although the placing of the outlet below the level of the shoulder undoubtedly creates a very substantial pressure within the shell before seating takes place.

As previously noted, other forms of fittings may be made. For certain forms or shapes, different variations in the wall thickness of the shell may be required in order to obtain a finished product having a wall thickness of commercial uniformity. While we have referred to the finished product as a fitting, it is to be understood that this expression, as used, is not limited to pipe fittings, but is intended to cover products of this nature regardless of the use to which they are to be placed. The foregoing description of our invention has been made for the purpose of illustration only, and is not to be considered in any manner as constituting a limitation of the scope thereof, which is to be determined by the appended claims viewed in the light of the prior art.

We claim:

1. The method of forming a hollow article which comprises forming a shell adapted to contain liquid, placing the shell within a die having a feed channel and a shaping channel with the die in the feed channel and with liquid in the shell, causing to descend into the feed channel a punch having a pilot portion which enters the inside of the shell and traps liquid in the shell by close fit with the shell and having a shoulder which abuts against the rim of the shell, causing the punch to effect said close fit prior to its abutment with the rim of the shell to produce a preliminary internal liquid pressure prior to mechanical action of the punch on the shell, and continuing movement of the punch after said rim abutment to cause the shell to be distorted and follow the wall of the shaping channel due to mechanical end pressure applied to the shell by the punch and liquid pressure within the shell.

2. A method as set forth in claim 1 which includes filling the shell with a quantity of liquid in excess of that to be trapped within the shell by the punch, relieving the shell of excess liquid by passage thereof in the pilot portion of the punch, and causing relative movement of the pilot portion and shell to close the relief passage prior to abutment of the punch with the rim of the shell to trap the given quantity and cause the preliminary internal liquid pressure on movement of the punch between the point of cut-off and the point of rim abutment.

3. The method of forming a hollow article which comprises forming a shell adapted to contain liquid, placing the shell within a die having a feed channel and a shaping channel with the shell in the feed channel and with an excess quantity of liquid in the shell, causing to descend into the feed channel a punch having a shoulder adapted to abut against the rim of the shell and having therebelow a pilot portion which has an upper part thereof formed to have close fit with the shell and a lower part for expulsion of excess liquid, expelling the excess liquid due to the entry of the lower punch part, causing the punch to effect said close fit prior to its abutment with the rim of the shell, to produce a preliminary internal liquid pressure prior to mechanical action of the punch on the shell, and continuing movement of the punch after said rim abutment to cause the shell to be distorted and follow the wall of the shaping channel due to mechanical end pressure applied to the shell by the punch and liquid pressure within the shell.

4. The method of forming a wrought metal T fitting which comprises forming a shell adapted to contain liquid, placing the shell within a die having a feed channel and a plurality of shaping channels, said channels extending along given axes, the axis of the feed channel being at an angle of substantially ninety degrees to an intersecting the axes of the shaping channels, the shell being placed in the feed channel, causing to descend into the feed channel a punch having a pilot portion which enters the inside of the shell and traps liquid in the shell by close fit with the shell and having a shoulder which abuts against the rim of the shell, causing the punch to effect said close fit prior to its abutment with the rim of the shell to produce a preliminary internal pressure prior to mechanical action of the punch on the shell, and continuing movement of the punch after said rim abutment to cause the wall of the shell to be worked into the shaping channels against the die to form the run portion of the T fitting due to mechanical end pressure applied to the shell by the punch and liquid pressure within the shell.

5. The method of forming a pipe fitting having intersecting branches angularly disposed substantially at ninety degrees which comprises producing an elongated shell having an open end and an end portion closing the opposite end, the thickness of the wall of said end portion being greater than the wall thickness at the open end and at least a substantial portion of the wall between said end portion and the open end including a portion adjacent to said end portion being of decreasing thickness from said end portion toward the open end, placing the shell with liquid therein in a die having a feed channel and a shaping channel, said channels having intersecting axes angularly disposed at substantially ninety degrees to correspond with the branches of the fitting to be formed, the shell being placed in the feed channel, causing the amount of liquid in said shell to be of fixed value, abutting a punch against the open end of the shell to cause mechanical pressure endwise of the shell, and moving the punch to work the thicker part of the shell into the shaping channel due to mechanical end pressure and internal liquid pressure, the thickness of shell material at and adjacent to the closed end serving to compensate for the lack of external support and stretching at the place where the material is worked into the shaping channel to provide ultimate substantially uniform wall thickness of the pipe fitting.

6. The method of forming a tubular T fitting which comprises producing a cylindrical shell having an open end and an end portion closing the opposite end, the thickness of the wall of said end portion being greater than the wall thickness at the open end and at least a substantial portion of the cylindrical wall including the portion adjacent to said end portion being of decreasing thickness from said end portion toward the open end, placing the shell with liquid therein in a die having a feed channel and a shaping channel, with the shell in the feed channel, the feed channel intersecting the shaping channel at a mid-point thereof and being substantially normal to the general direction of the shaping channel, causing the amount of liquid in the shell to be of fixed value, abutting a punch against the open end of the shell to cause mechanical pressure endwise of the shell, and moving the punch to work the thicker part of the shell into the shaping channel due to mechanical end pressure and internal liquid pressure, the thickness of shell material at and adjacent to the closed end serving to compensate for the lack of external support and stretching at the place where the material is worked into the shaping channel to provide ultimate substantially uniform wall thickness.

7. Apparatus for distorting a hollow shell by mechanical end pressure and pressure of liquid within the shell to form a hollow article having a neck and an expanded part including cooperating die blocks providing a feed channel and a shaping channel, said feed channel being adapted to receive the shell therein and conforming to the exterior surface of the shell, and a punch adapted to enter the feed channel, said punch having a shoulder and a pilot portion below the shoulder and having a cross-section above the shoulder to provide compressive abutment of the shoulder on the rim of the shell, said pilot portion having a channel communicating with the liquid space of the shell and having an outflow point positioned below the shoulder so that on downward movement of the punch said outlet passes the rim of the shell prior to abutment of the punch shoulder with the rim of the shell to produce an initial internal liquid pressure prior to movement of the shell by mechanical end pressure.

8. Apparatus for distorting a hollow shell by mechanical end pressure and pressure of liquid within the shell to form a hollow article having a neck and an expanded part which includes a die having a feed channel and a shaping channel, said feed channel being constructed to receive the shell therein, and a punch adapted to enter the feed channel and having a pilot portion adapted to enter the shell and having a shoulder at the top of the pilot portion adapted to abut the rim of the shell, said pilot portion having a liquid bottling portion below said shoulder to confine liquid under pressure in the shell prior to abutment of the shell rim and punch shoulder and extending below said bottling portion, the part below said bottling portion being formed to allow escape of liquid past the punch.

9. Apparatus as set forth in claim 8 in which the pilot portion of the punch includes a channel communicating with the liquid space of the shell and having an outlet at the bottom of the bottling portion adapted to be closed by the shell on downward movement of the punch.

10. Apparatus as set forth in claim 8 in which the pilot portion of the punch is tapered below the bottling portion.

11. Apparatus as set forth in claim 8 in which the shaping channel includes branches on opposite sides of the feed channel whereby the shell is distorted to T-shape.

12. Apparatus for distorting a hollow shell by mechanical end pressure and pressure of liquid within the shell to form a hollow article having a neck and an expanded part including cooperating die blocks providing a feed channel and a shaping channel, said feed channel being adapted to receive the shell therein and conforming to the exterior surface of the shell, and a punch adapted to enter the feed channel, said punch having a shoulder and having a cross-section above the shoulder to provide compressive abutment of the shoulder on the rim of the shell, said pilot portion being of such cross-sectional form and dimensions for an appreciable distance below said shoulder as to close the shell against egress of liquid therefrom at a point in the stroke of the punch prior to abutment of the punch shoulder with the rim of the shell, whereby an initial internal liquid pressure is produced in the shell prior to movement of the shell by mechanical end pressure.

FRANS B. WENDEL.
THOMAS H. PEARSALL.